US008107878B2

(12) United States Patent
Alameh et al.

(10) Patent No.: US 8,107,878 B2
(45) Date of Patent: Jan. 31, 2012

(54) METHODS AND APPARATUS FOR USER-SELECTABLE PROGRAMMABLE HOUSING SKIN SENSORS FOR USER MODE OPTIMIZATION AND CONTROL

(75) Inventors: Rachid M Alameh, Crystal Lake, IL (US); Thomas E Gitzinger, Libertyville, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 895 days.

(21) Appl. No.: 11/936,198

(22) Filed: Nov. 7, 2007

(65) Prior Publication Data
US 2009/0117951 A1 May 7, 2009

(51) Int. Cl.
*H04B 7/15* (2006.01)
(52) U.S. Cl. ............. 455/41.1; 455/41.2; 455/575.1; 455/3.03; 700/236; 707/770
(58) Field of Classification Search ............. 455/575.1, 455/90.3, 556.1, 550.1, 90.1, 411, 78, 415, 455/41.2, 434, 420, 419, 462, 41.1; 324/658; 345/169; 340/5.52, 5.74; 700/236, 231; 707/770; 361/679.01
See application file for complete search history.

(56) References Cited

U.S. PATENT DOCUMENTS

| | | | |
|---|---|---|---|
| 4,071,691 A | 1/1978 | Pepper, Jr. | |
| 4,103,252 A | 7/1978 | Bobick | |
| 4,495,485 A | 1/1985 | Smith | |
| 4,740,781 A | 4/1988 | Brown | |
| 5,012,124 A | 4/1991 | Hollaway | |
| 5,036,321 A | 7/1991 | Leach et al. | |
| 5,068,653 A | 11/1991 | Klingler et al. | |
| 5,337,353 A | 8/1994 | Boie et al. | |
| 5,463,388 A | 10/1995 | Boie et al. | |
| 5,541,609 A | 7/1996 | Stutzman et al. | |
| 5,543,590 A | 8/1996 | Gillespie et al. | |
| 5,559,504 A | 9/1996 | Itsumi et al. | |
| 5,565,658 A | 10/1996 | Gerpheide et al. | |
| 5,710,400 A | 1/1998 | Lorenz et al. | |
| 5,861,875 A | 1/1999 | Gerpheide | |
| 5,923,522 A | 7/1999 | Sajna | |
| 6,222,528 B1 | 4/2001 | Gerpheide et al. | |
| 6,297,811 B1 | 10/2001 | Kent et al. | |
| 6,442,013 B1 | 8/2002 | Lindgren et al. | |

(Continued)

FOREIGN PATENT DOCUMENTS
AU 704945 B2 1/1997
(Continued)

OTHER PUBLICATIONS

United States Patent and Trademark Office, "Non-Final Office Action Summary", Mar. 20, 2008, pp. 1-8, U.S. Appl. No. 10/972,662.

*Primary Examiner* — Tan Trinh (57) ABSTRACT

An embodiment relates generally to a method of operating a device. The method includes providing for a plurality of sensors, where each sensor is configured to sense and transmit data values associated with an interaction with the device by a user. A subset of the sensors of the plurality of sensors is associated with a respective facing on a housing of the device. The method also includes operating the plurality of sensors to detect the interaction with the device by the user and receiving sensor data associated with the interaction from the plurality of sensors. The method further includes determining a user mode of the device based on the sensor data associated with the interaction.

17 Claims, 6 Drawing Sheets

U.S. PATENT DOCUMENTS

| | | | |
|---|---|---|---|
| 6,546,101 B1 | 4/2003 | Murray et al. | |
| 7,256,767 B2 * | 8/2007 | Wong et al. | 345/158 |
| 7,339,493 B2 * | 3/2008 | El Zabadani et al. | 340/825.7 |
| 7,401,300 B2 * | 7/2008 | Nurmi | 715/866 |
| 2001/0006907 A1 | 7/2001 | Park | |
| 2002/0049070 A1 | 4/2002 | Bick | |
| 2002/0068537 A1 | 6/2002 | Shim et al. | |
| 2004/0204000 A1 * | 10/2004 | Dietrich et al. | 455/550.1 |
| 2004/0204190 A1 * | 10/2004 | Dietrich et al. | 455/575.1 |
| 2004/0248523 A1 * | 12/2004 | Nishimura et al. | 455/78 |
| 2004/0257196 A1 * | 12/2004 | Kotzin | 340/5.52 |
| 2005/0068044 A1 * | 3/2005 | Peine et al. | 324/658 |
| 2005/0101250 A1 * | 5/2005 | Helal et al. | 455/41.2 |
| 2006/0097992 A1 | 5/2006 | Gitzinger et al. | |
| 2006/0101263 A1 | 5/2006 | Costea et al. | |
| 2007/0173297 A1 | 7/2007 | Cho et al. | |
| 2008/0220752 A1 * | 9/2008 | Forstall et al. | 455/415 |
| 2008/0280640 A1 * | 11/2008 | Wedel et al. | 455/556.1 |
| 2008/0317379 A1 * | 12/2008 | Steinberg et al. | 382/275 |
| 2009/0177068 A1 * | 7/2009 | Stivoric et al. | 600/365 |

FOREIGN PATENT DOCUMENTS

| | | |
|---|---|---|
| JP | 7-168930 A | 7/1995 |
| JP | 2000-295327 A | 10/2000 |
| JP | 2001-311946 A | 11/2001 |
| JP | 2002-082914 A | 3/2002 |
| KR | 2003-0018523 A | 3/2003 |
| KR | 10-2006-0035833 A1 | 4/2006 |
| KR | 10-2006-0103949 A | 10/2006 |
| KR | 10-2007-0077528 A | 7/2007 |
| WO | 00/79768 A1 | 12/2000 |

* cited by examiner

METHODS AND APPARATUS FOR USER-SELECTABLE PROGRAMMABLE HOUSING SKIN SENSORS FOR USER MODE OPTIMIZATION AND CONTROL

FIELD

This invention relates to selecting applications in a mobile device, more particularly, to methods, systems and apparatus for user selectable programmable housing skin sensors on the mobile device for user mode optimization and control.

DESCRIPTION OF THE RELATED ART

Presently, mobile communication devices and hand held portable devices such as mobile phones, pagers, portable games, remote controls, and the like, provide communication and other functionality for users on the go. For example, a user with a mobile phone can place a call while engaging in another activity, such as walking.

Each user may hold a mobile phone slightly different from the next user. This can adversely affect microphone and speaker performance, which results in poor detection of the user's voice and non-optimal volume output from the speaker, respectively. Furthermore, the user may hold the phone with the antenna at a varying distance from the user's head. This can adversely affect antenna and transmission performance because of sub-optimal tuning of antenna matching circuitry.

In addition, as the user is engaged in another activity, it can be difficult for the user to select the proper mode of operation of the hand held portable device. One example can be switching from a call mode to an image capture mode on the device while driving. Safety concerns demand that full attention to be paid to the driving activity. Moreover, as part of switching operating modes of a handheld portable device, conventional devices often require the user to navigate through numerous menus to select a mode or function (e.g., text messaging, camera, game, etc.).

Accordingly, there is a need in the art to be able to personalize the functions of a mobile telephone to the use habits of the user to optimize performance of the mobile telephone. Moreover, there is a need for the mobile telephone to find a mechanism to switch modes in a more efficient manner.

SUMMARY

An embodiment relates generally to a method of operating a device. The method includes providing for a plurality of sensors, where each sensor is configured to sense and transmit data values associated with an interaction with the device by a user. A subset of the sensors of the plurality of sensors is associated with a respective facing on a housing of the device. The method also includes operating the plurality of sensors to detect the interaction with the device by the user and receiving sensor data associated with the interaction from the plurality of sensors. The method further includes determining a user mode of the device based on the sensor data associated with the interaction and/or handling of the device.

Another embodiment pertains generally to an apparatus for customizing a user experience. The apparatus includes a controller and a housing configured to enclose the controller. The apparatus also includes a plurality of sensors, where each sensor is configured to sense and transmit data values to the controller in response to an interaction with the apparatus by a user and where at least one sensor of the plurality of sensors is associated with a side of a housing. The apparatus further includes a user personalization module coupled with the controller and configured to personalize the device by storing a plurality of user modes. The controller is configured to receive sensor data associated with the interaction from the plurality of sensors and to determine a selected user mode from the plurality of user modes based on the received sensor data associated with the interaction from the plurality of sensors.

Yet another embodiment relates generally to a method of personalizing a mobile telephone. The method includes providing for a plurality of sensors, where each sensor is configured to sense and transmit data values associated with an interaction with the mobile telephone by a user and a subset of the sensors of the plurality of sensors is associated with a respective facing on a housing of the mobile telephone. The method also includes storing a plurality of user modes for the mobile telephone, where each user mode is associated with a set of sensor values from the plurality of sensors. The method further includes operating the plurality of sensors to detect a current interaction with the mobile telephone by the user and selecting a user mode of the mobile telephone based on the sensor data from the plurality of sensors associated with the current interaction.

Accordingly, a user can personalize a mobile telephone with the respective use habits of the user. As a result, a user can use the mobile telephone more efficiently and in a safer manner while engaged in other activities.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of mobile communication devices, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments pertain generally to methods and apparatus for personalizing a mobile telephone. More particularly, a controller can be configured to couple with a network of sensors. The sensors can be distributed over the housing of the mobile telephone. Each sensor can be assigned to an area of the housing and can be implemented as a capacitive, pressure, conductive, or other touch sensitive sensor.

The controller can execute a personalization module that can be configured to personalize or program the mobile telephone to the user. More specifically, the personalization module can generate an image of a mode, e.g., talking, of the mobile telephone for the user to emulate in a calibration (or configuration, program, etc.) mode. As the user emulates the displayed image, the personalization module can then be configured to collect the data from the network of sensors through the controller to obtain a set of data for a predetermined amount of time as a sensor profile. The received sensor profile is associated with the mode and stored. Subsequently, as the user manipulates the mobile telephone, the mobile telephone can determine a use mode by comparing the stored sensor profiles with the current sensor profile.

The personalization module can also be configured to update the configuration data associated with a (use) mode. More particularly, a user may eventually drift from the initial position captured by the data collection during the programming mode, i.e., tactile interaction. Accordingly, the personalization module can periodically collect data from the network of sensors during a selected mode as a current sensor profile and compare the use data with the associated configuration data, i.e., stored sensor profiles. If the variance between the current sensor profile and the stored sensor profiles exceeds a predetermined threshold, the personalization module can be configured to initiate the programming mode for the selected mode. Alternatively, the personalization module can update the stored sensor profile with the current sensor profile.

Figure 1A:
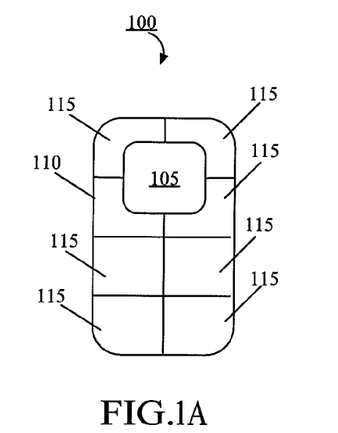
FIGS. 1A-D, collectively, depict distribution of skin sensors on the housing of a mobile telephone in accordance with an embodiment.
Figure 1B:
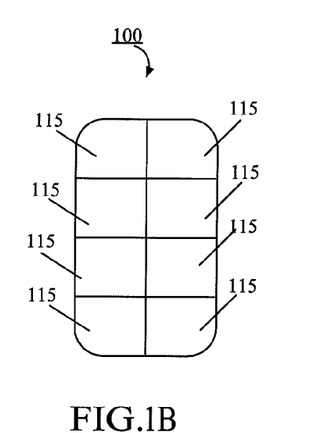
Figure 1C:
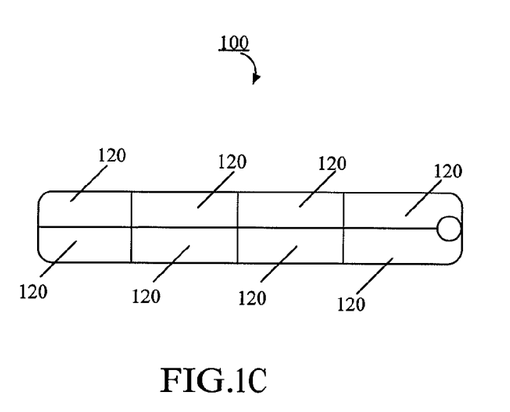

FIGS. 1A-C collectively illustrate an exemplary distribution of sensors over a housing of a mobile telephone. For the shown embodiments, it should be readily apparent to those of ordinary skill in the art that the number of sensors and the placements of the sensors can be varied without departing from the scope and breadth of the claimed invention. Moreover, FIGS. 1A-C share some common features. Accordingly, the description of the common features in the latter figures are being omitted and that the description of these feature with respect to the first figure are being relied upon to provide adequate description of the common features.

FIG. 1A shows a front view of a mobile telephone 100 and FIG. 1B depicts a back view of the mobile telephone 100. The mobile telephone 100 includes an exterior display 105 and a housing 110. The housing 110 can be a "clamshell" configuration. Other embodiments of the housing 110 can be a "candy-bar", a slider configuration, or other mobile telephone housings. The housing 110 can be partitioned into sensor areas 115. Each sensor area 115 can be serviced by a single sensor or multiple sensors (e.g., tactile, distance, gyroscope, accelerometer, etc.).

FIG. 1C illustrates a side view of the mobile telephone 100 with side sensor areas 120. In some embodiments, the side sensor areas 120 can be part of respective sensor area 115 from the top and bottom of the housing 110.

Figure 1D:
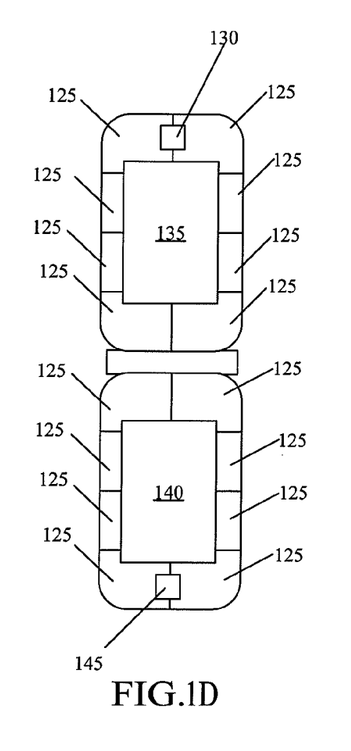

FIG. 1D shows a view of the mobile telephone 100 in an open configuration. As shown 9 in FIG. 1D, the interior sensor areas 125 can be placed surrounding the speaker 130, an interior display 135, a keypad 140, and a microphone 145. While the sensors associated with a particular surface are illustrated as being fairly uniform in size and shape, one skilled in the art will readily recognize that the size, shape and concentration of discrete sensors can vary relative to different areas of a particular housing surface of the handheld device without departing from the teachings of the present invention. For example, there may be an increase in the density of discrete sensors and a corresponding increase in the number of sensors proximate an area where a user is more likely to interact with the housing.

The sensor(s) (not shown in FIGS. 1A-D) servicing each sensor area 115, 120, and 125 can be implemented as sensor deposits. The sensor can be deposited as carbon paint during the housing manufacturing phase, which is then painted over (in the event of outside skin deposits) to internal sensing deposits placed on the inside of the housing material. The sensor deposits can be prepared from materials such as copper, carbon, or other materials with some level of conductivity.

Other methods for applying conductive material on exterior surfaces can include a flex circuit, a conductive paint, a conductive label, plating, vacuum metallization, plasma coating, in mold decoration (conductive ink), film insert molding (conductive ink), metal insert (e.g., glob label or decorative metal bezel), conductive plastic molding, etc.

The sensor deposits can be designed to make contact with a hardware contact of the sensor network that connects the sensors with the controller. The controller can be configured with numerous integrated electrical switches, which then drives the sensing hardware. The switches can be controlled by the processor of the mobile telephone and can be re-programmed as needed. Examples of the electrical interface between the sensor deposits and the sensor network are shown in FIGS. 2A-D.

Figure 2A:
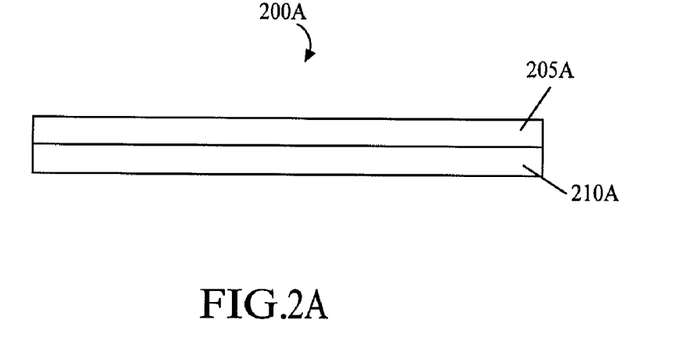
FIGS. 2A-D, collectively, illustrate exemplary sensors in accordance with various embodiments.

FIG. 2A shows a capacitive interconnect 200A between an exterior conductive material 205A and an interior conductive material 210A. The exterior conductive material 205A can be deposited over the interior conductive material 210A, which is then coupled to an external sensor plate (not shown).

Figure 2B:
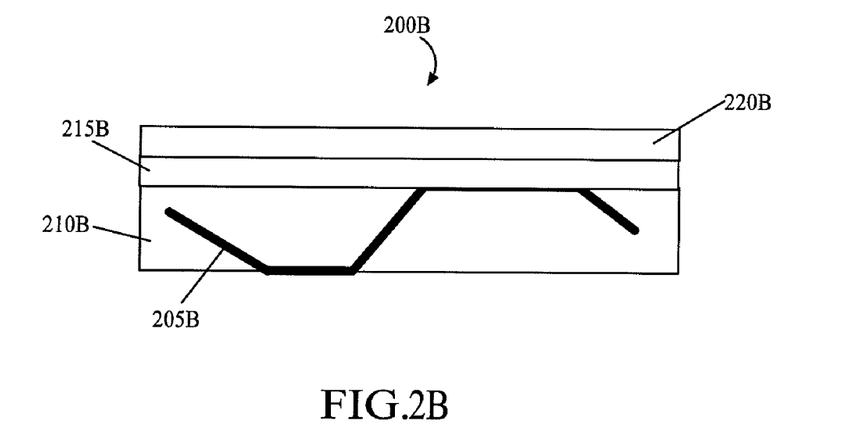

FIG. 2B depicts an insert molded contact configuration 200B in accordance with another embodiment. As shown in FIG. 2B, the configuration 200B has a metal clip 205B that can be insert molded into a plastic 210B. The plastic 210B can be flush with an exterior surface of the housing 110. An in mold/film decoration 215B can be used as a conductive surface with a decorative/protective overcoat 220B. In other embodiments, the mold/film decoration 215 can be painted with a conductive paint.

Figure 2C:
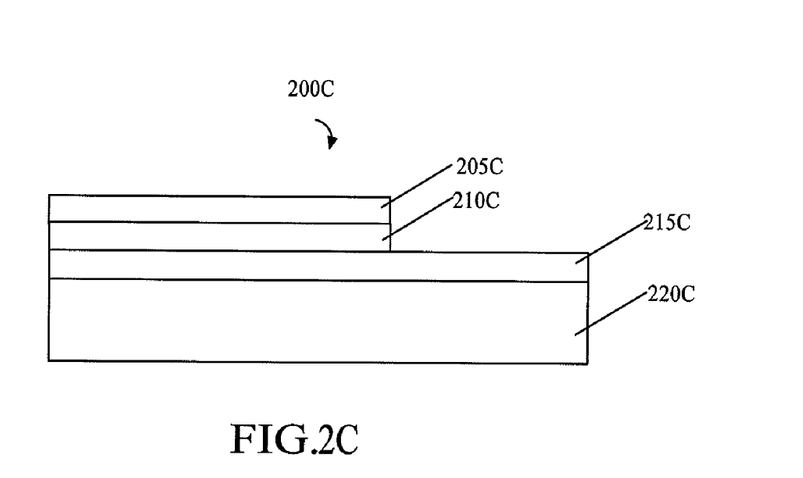

FIG. 2C illustrates a spring contact configuration 200C in accordance with yet another embodiment. As shown in FIG. 2C, the configuration 200C can comprise a protective surface 205C deposited over a cosmetic layer 210C and underneath the housing of the mobile telephone. The cosmetic layer 210C can be adjacent to a conductive sensor material 215C, which abuts a wall 220C of the housing 110. The wall 220C can then be positioned next to the interior of the mobile telephone.

The cosmetic layer 210 can have a voided area that exposes the conductive sensor material 215C. A spring clip can then be used to connect the exterior contact zone to the interior part of the phone. The configuration 200C can require an opening in the housing 110.

Figure 2D:
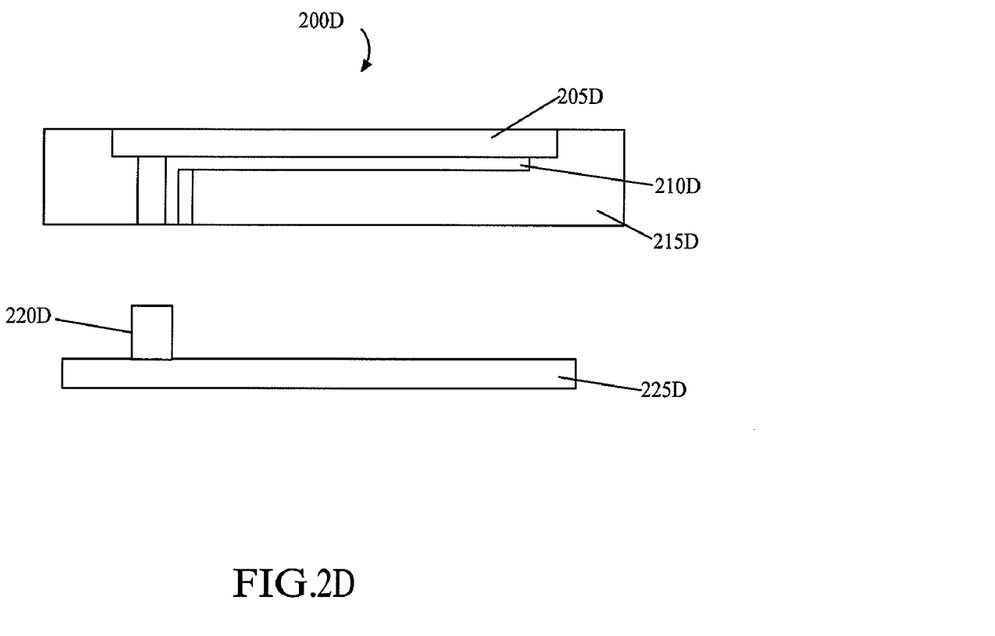

FIG. 2D shows a flex/conductive label contact configuration 200D in accordance with yet another embodiment. As shown in FIG. 2D, configuration 200D can comprise a cosmetic overlay layer 205D deposited over a flex circuit 210D embedded within housing wall 215D. In this embodiment, a tail portion of the flex circuit 210D can be coupled through a housing opening for contact to the interior electronics. A pressure contact 220D can be coupled to a capacitive touch sensor circuit 225D. As a user presses or holds the exterior of the housing wall, the housing wall can make contact with flex circuit 210D and complete the circuit of the flex circuit 210D, the pressure contact 220D and the capacitive touch sensor circuit 225D.

Figure 3:
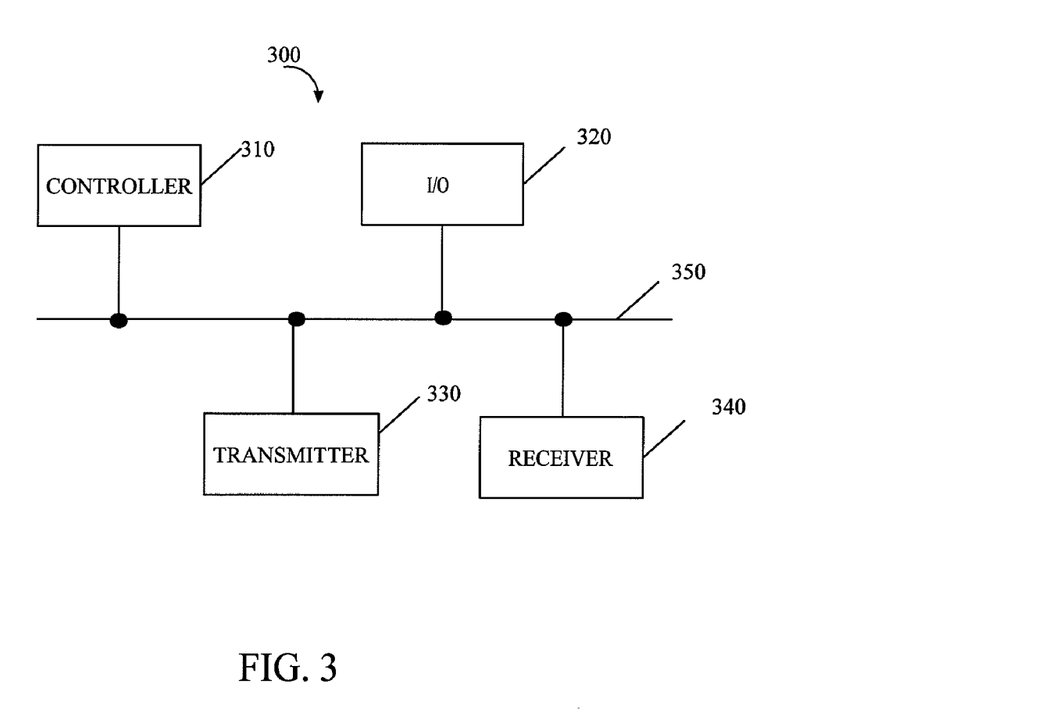
FIG. 3 illustrates a block diagram of a mobile telephone in accordance with yet another embodiment.

FIG. 3 illustrates a block diagram 300 of the mobile telephone 100 in accordance with yet another embodiment. It should be readily apparent to those of ordinary skill in the art that the block diagram depicted in FIG. 3 represents a generalized schematic illustration and that other components may be added or existing components may be removed, combined or modified.

As shown in FIG. 3, the mobile telephone 100 can include a controller 310, input/output (I/O) circuitry 320, transmitter circuitry 330, receiver circuitry 340, and a bus 350. In operation, the bus 350 allows the various circuitry and components of the mobile telephone 100 to communicate with each other. The I/O circuitry 320 provides an interface for the I/O devices such as the exterior display 105, the speaker 130, the display 135, the keypad 140, and the microphone 145. The transmitter circuitry 330 provides for the transmission of communication signals to other mobile communication devices, base stations, or the like. The receiver circuitry 340 provides for the reception of communication signals from other mobile telephones, base stations, or the like. The controller 310 controls the operation of the mobile telephone 100.

Figure 4:
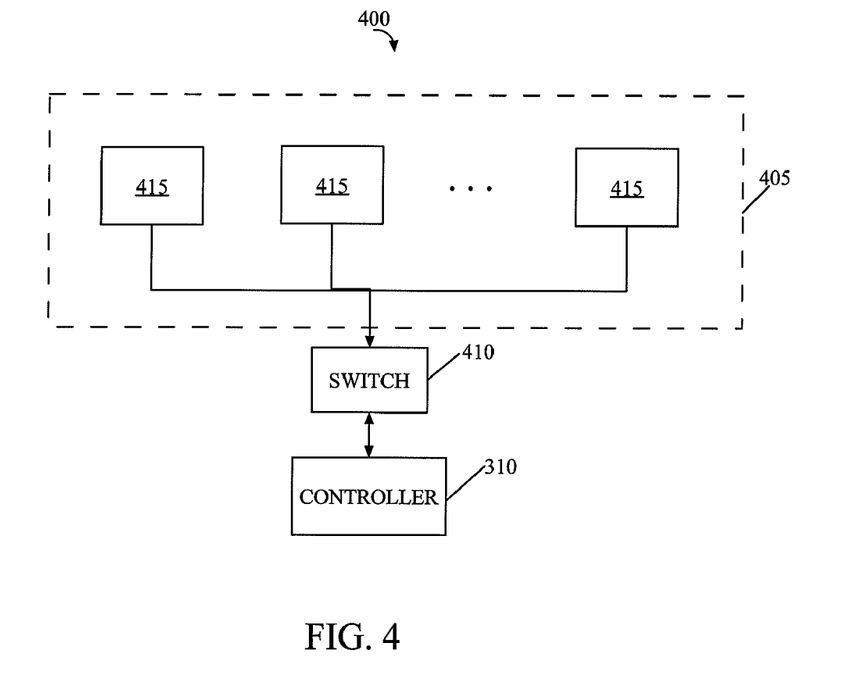
FIG. 4 depicts a block diagram of a controller and the sensor network in accordance with yet another embodiment.

In some embodiments, the controller 310 can be interfaced with a sensor network as shown in FIG. 4. As shown in FIG. 4, the controller 310 can be coupled to a sensor network 405 through a switch 410. The sensor network 405 can be implemented with skin sensors as previously described. One or more skin sensors can be implemented in a sensor area (see FIGS. 1A-D, areas 110, 115, 120, and 125) on the housing 110 of the mobile telephone 100. The switch 410 can be configured to direct data from the sensor network 405 to the controller 310 for processing.

Figure 5:
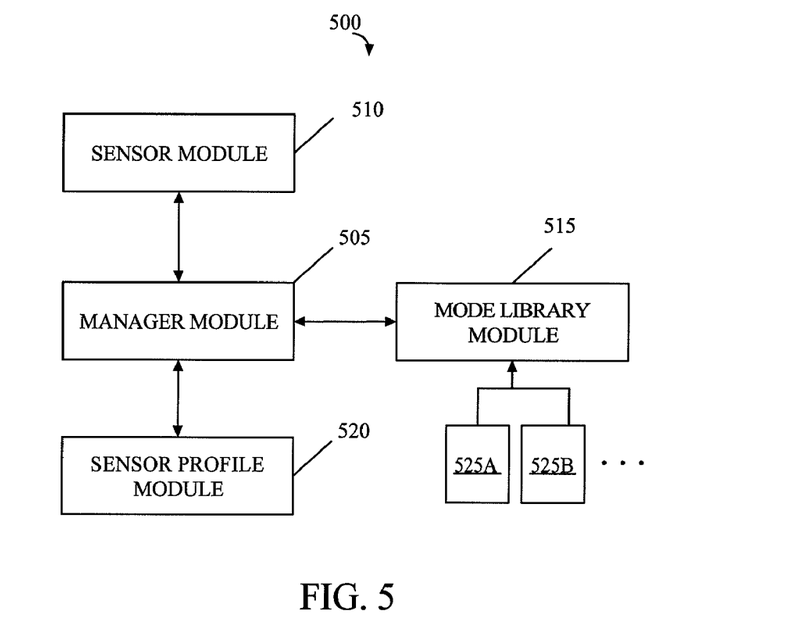
FIG. 5 illustrates an exemplary flow diagram executed by the controller in accordance with yet another embodiment.

The controller 310 can be configured to include a personalization module as shown in FIG. 5, which depicts an exemplary block diagram of the personalization module 500 in accordance with yet another embodiment. It should be readily apparent to those of ordinary skill in the art that the block diagram 500 depicted in FIG. 5 represents a generalized schematic illustration and that other components may be added or existing components may be removed or modified.

As shown in FIG. 5 the personalization module 500 can comprise a manager module 505, a sensor module 510, a mode library module 515 and a sensor profile module 520. The manager module 505 can be configured to provide the functionality of the personalization module 500 as described previously and in greater detail below. The manager module 505 can be coupled to the sensor module 510. The sensor module 510 can be configured to interface with the sensor network 405 through the switch 410. The sensor module 510 can then provide an interface for the manager module 505 to collect data from the respective sensors 415 of the sensor network 405.

The manager module 505 can also be coupled with the mode library module 515. The mode library module 515 can be configured to store images or icons associated with respective modes of the mobile telephone. For example, image 525A can be an image of a user holding a telephone to represent or image 525B can be an image of a user using the telephone in a speakerphone mode. Accordingly, when the manager module 505 is placed in a calibration (or personalization, program, etc.) mode, the manager module 505 can display a selected image of a user mode for a user to emulate. As the user is emulating the displayed image, the manager module 505 can then collect a set of configuration/calibration data, i.e., a sensor profile, from the sensors 415 of the sensor network 405 through the sensor module 510. Subsequently, the manager module 505 can store and associate the received sensor profile with the selected mode in the sensor profile module 520. As a result of storing sensor profiles for each mode of operation of the mobile telephone, a user can operate a mobile telephone in different modes by merely changing how the user holds the mobile telephone.

The sensor profile module 520 can store use modes such as anticipation modes. One example of an anticipation mode can be a mobile telephone can initiate full power on, the display being turned on, etc. in response to detecting that it is being picked up by the user. Another example of an anticipation mode can be the mobile telephone changing ring tone, increasing the volume, turning off the display, etc., in response to detecting that it is being put on a table. Yet another example of an anticipation mode can be the mobile telephone enabling an idle mode in response to detecting that it is plugged to a charger.

Figure 6:
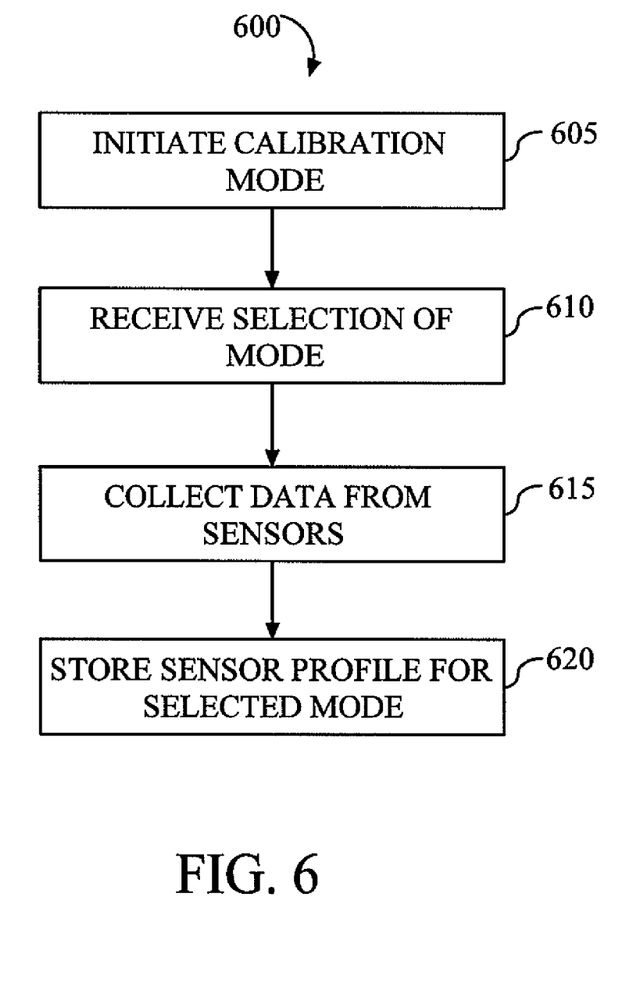
FIG. 6 shows another exemplary flow diagram in accordance with yet another embodiment.

FIG. 6 shows a flow diagram 600 executed by the manager module 505 in accordance with yet another embodiment. It should be readily apparent to those of ordinary skill in the art that the flow diagram 600 depicted in FIG. 6 represents a generalized schematic illustration and that other steps may be added or existing steps may be removed or modified.

As shown in FIG. 6, the manager module 505 can be configured to be in a calibration mode, in step 600. More particularly, a user may have manipulated the keypad 140 of the mobile telephone 100 to enter a configuration/calibration mode. The manager module 505 can be configured to display a predetermined number of images that represent each mode of the mobile telephone. A user could scroll through the images by operating appropriate buttons of the keypad 140. The manager module 505 can then enter a wait state until a user selects a mode to calibrate or program.

In step 610, the manager module 505 can receive the selection of the mode to program. Accordingly, the manager module 505 can display the selected image on the LCD 140.

In step 615, the manager module 505 can be configured to collect data from the sensors 415 of the sensor network 405 for a predetermined amount of time. The manger module 505 can buffer the incoming data from sensor network.

In step 620, the manager module 505 can be configured to store the collected data as a set of configuration data, i.e., a sensor profile, for the selected mode. The manager module 505 can then store the sensor profile linked with the selected mode in the sensor profile module 520. Subsequently, the manager module 505 can then exit the calibration/programming mode.

Figure 7:
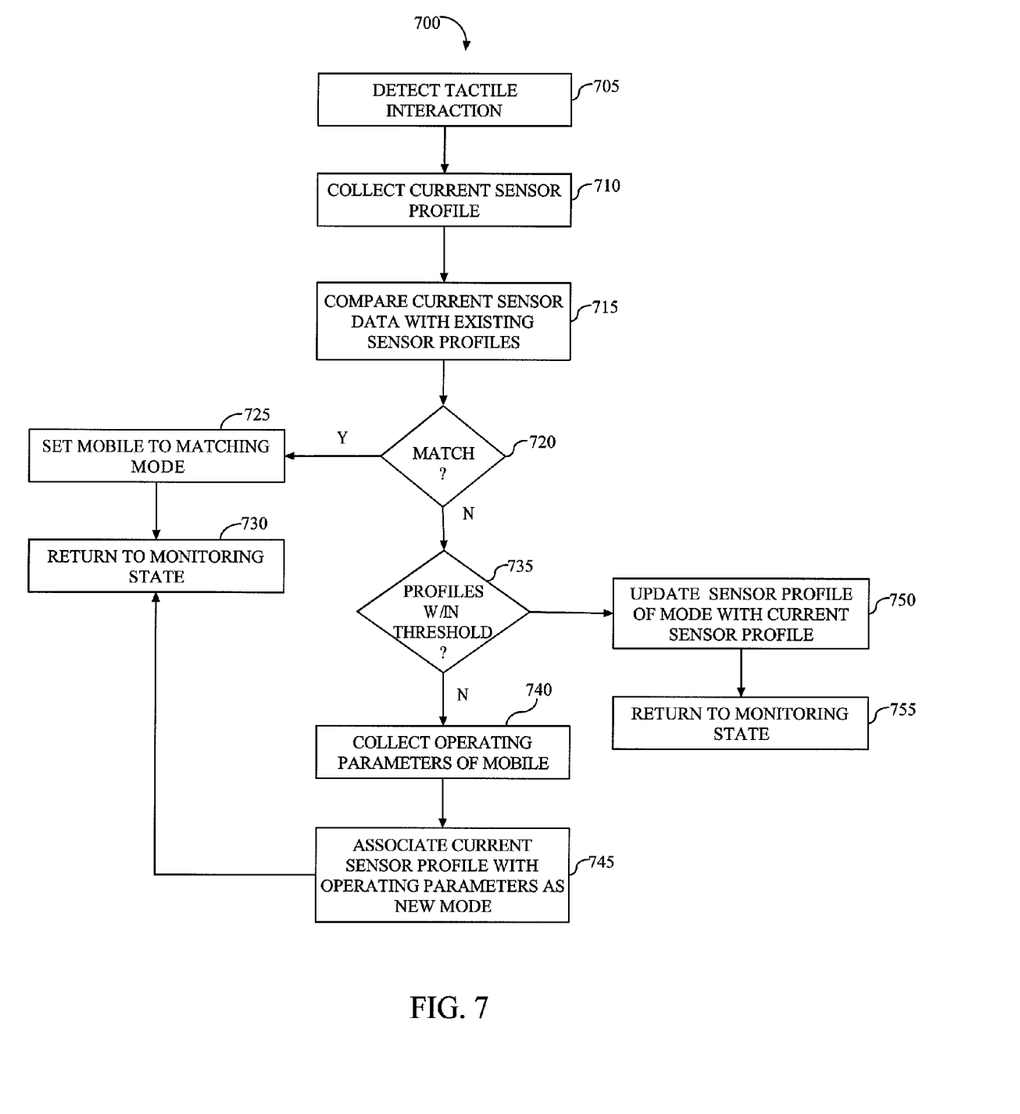
FIG. 7 depicts yet another exemplary flow diagram in accordance with yet another embodiment.

FIG. 7 shows a flow diagram 700 executed by the manager module 505 in accordance with yet another embodiment. It should be readily apparent to those of ordinary skill in the art that the flow diagram 700 depicted in FIG. 7 represents a generalized schematic illustration and that other steps may be added or existing steps may be removed or modified.

As shown in FIG. 7, the manager module 505 of the personalization module 500 can be configured to detect a tactile interaction by the user, in step 705. More particularly, the sensor module 510 can receive a set of operating data as a current sensor profile from the active sensors 415 of the sensor 405.

In step 710, the manager module 505 can be configured to initially buffer the current sensor profile from the sensor module 510. In step 715, the manager module 505 can be configured to determine a mode based on the collected sensor profiles stored in the sensor profile module 520. More particularly, the manager module 505 can compare the current sensor profile with the stored sensor profiles.

If there is a match between the current sensor profile and a stored sensor profile, in step 720, the manager module 505 can notify the controller 310 to operate the mobile telephone in the matching mode, in step 725. Subsequently, the manager module 505 can enter a monitoring state, in step 730.

Otherwise, if there is not a match, in step 720, the manager module 505 can be configured to determine whether the current sensor profile is within a predetermined threshold of any of the stored sensor profiles, in step 735.

If one of the stored sensor profiles is within the predetermined threshold, the manager module 505 can be configured to update the matching sensor profile with the current sensor profile, in step 750, thereby allowing the previously stored interaction associated with a particular mode to migrate and/or change over time without necessarily requiring a new interaction to be associated with an existing mode to be expressly detected and stored to accommodate an aggregate of multiple subtle migratory changes in user interaction over time, which might no longer match the originally stored interaction. Subsequently, the manager module 505 can then enter the monitoring state, in step 755.

If none of the stored sensor profiles are within the predetermined threshold, in step 735, the manager module 505 can be configured to collect the operating parameters of the mobile telephone 100, in step 740. The manager module 505 can then be configured to associate the current sensor profile with the current operating parameters of the mobile telephone 100 as a new mode. The manager module 505 can then store the sensor profile in the sensor profile module 520. Subsequently, the manager module 505 can enter a monitoring state of step 730.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of operating a device, the method comprising:
providing for a plurality of sensors, each sensor configured to sense and transmit data values associated with an interaction with the device by a user, wherein a subset of the sensors of the plurality of sensors is associated with a respective facing on a housing of the device;
operating the plurality of sensors to detect the interaction with the device by the user;
receiving sensor data associated with the interaction from the plurality of sensors;
determining a user mode of the device based on the sensor data associated with the interaction;
entering a learning mode;
providing at least one training image associated with a first user mode; and
collecting sensor data values from the plurality of sensors as a user implements the at least one training image for a predetermined amount of time as a first user mode configuration data.

2. The method of claim 1, wherein the determining the user mode of the device further comprises comparing the sensor data associated with the interaction to pre-stored sensor data.

3. The method of claim 1, further comprising:
detecting a second interaction with the device by the user;
receiving sensor data associated with the second interaction from the plurality of sensors; and
determining a second user mode of the device based on the sensor data associated with the second interaction.

4. The method of claim 1, further comprising:
detecting a change in the sensor data; and
modifying an operating parameter of the device based on the changed sensor data.

5. The method of claim 1, further comprising storing the first user mode configuration data.

6. The method of claim 1, further comprising:
continuing to receive sensor data from the plurality of sensors during the first user mode as operating data; and
comparing the operating data with the first user mode configuration data.

7. The method of claim 6, further comprising providing the at least one training image in response to the operating data associated with the first user mode exceeding a predetermined deviation threshold with the first user mode configuration data and the device being in the first user mode.

8. The method of claim 6, further comprising updating the first user mode configuration data with the operating data in response to the operating data not exceeding a pre-determined deviation threshold with the configuration data and the device being in the first user mode.

9. The method of claim 1, further comprising:
identifying the user based on the interaction of the user with the device.

10. An apparatus for customizing a user experience, the apparatus comprising:
a controller;
a housing configured to enclose the controller;
a plurality of sensors, each sensor configured to sense and transmit data values to the controller in response to an interaction with the apparatus by a user, wherein at least one sensor of the plurality of sensors is associated with a side of the housing; and a user personalization module coupled with the controller and configured to personalize the device by storing a plurality of user modes, wherein the controller is configured to receive sensor data associated with the interaction from the plurality of sensors; and to determine a selected user mode from the plurality of user modes based on the received sensor data associated with the interaction from the plurality of sensors, wherein the user personalization module is further configured to enter a configuration mode, to display a predetermined graphical image associated with at least one user mode of the plurality of user modes; and to collect a set of configuration data from the plurality of sensors based on the user implementing the predetermined graphical image.

11. The apparatus of claim 10, wherein the user personalization module is configured to collect a set of operating data from the plurality of sensors for the selected user mode and to compare the set of operating data with the set of configuration data.

12. The apparatus of claim 11, wherein the user personalization module is further configured to enter the configuration mode in response to the set of operating data associated with the user mode exceeding a pre-determined variation threshold with the set of configuration data.

13. The apparatus of claim 12, wherein the user personalization module is further configured to replace the configuration data with a second set of configuration data collected from the plurality of sensors in response to the user implementing the predetermined graphical image associated with the user mode.

14. The apparatus of claim 11, wherein the user personalization module is configured to update the set of the configuration data with the set of operating data associated with the user mode in response to the set of operating data not exceeding a pre-determined variation threshold.

15. The apparatus of claim 10, wherein the user personalization module is further configured to detect a second interaction with the apparatus by the user; to receive sensor data associated with the second interaction from the plurality of sensors; and to determine a second user mode of the apparatus based on the sensor data associated with the second interaction.

16. The apparatus of claim 10, wherein the user personalization module is further configured to detect a second interaction with the apparatus by the user; to receive sensor data associated with the second interaction from the plurality of sensors; and to modify an operating parameter of the apparatus based on the sensor data associated with the second interaction.

17. A method of personalizing a mobile telephone, the method comprising:

providing for a plurality of sensors, each sensor configured to sense and transmit data values associated with an interaction with the mobile telephone by a user, wherein a subset of the sensors of the plurality of sensors is associated with a respective facing on a housing of the mobile telephone;

storing a plurality of user modes for the mobile telephone, each user mode associated with a set of sensor values from the plurality of sensors;

operating the plurality of sensors to detect a current interaction with the mobile telephone by the user; and selecting a user mode of the mobile telephone based on the sensor data from the plurality of sensors associated with the current interaction;

entering a configuration mode for the mobile telephone;

providing a graphical image associated with a selected user mode;

sensing sensor data values from the plurality of sensors as a configuration data in response to the user interacting with the mobile telephone as displayed by the graphical image; and associating the configuration data with the selected user mode.

* * * * *